(12) United States Patent
Piepereit

(10) Patent No.: US 8,893,455 B2
(45) Date of Patent: Nov. 25, 2014

(54) MATERIAL HANDLING APPARATUS

(75) Inventor: Edward Piepereit, Worcestershire (GB)

(73) Assignee: Matcon, Ltd., Evesham, Worcestershire (GB)

( * ) Notice: Subject to any disclaimer, the term of this patent is extended or adjusted under 35 U.S.C. 154(b) by 54 days.

(21) Appl. No.: 13/235,888

(22) Filed: Sep. 19, 2011

(65) Prior Publication Data

US 2012/0096819 A1 Apr. 26, 2012

(30) Foreign Application Priority Data

Sep. 17, 2010 (GB) .................................. 1015590.1

(51) Int. Cl.
*B65B 7/28* (2006.01)
*B67B 1/00* (2006.01)
*B67B 3/00* (2006.01)
*B67B 3/28* (2006.01)
*B65B 69/00* (2006.01)
*B65G 69/18* (2006.01)

(52) U.S. Cl.
CPC ............... *B65B 7/2842* (2013.01); *B65B 69/00* (2013.01); *B65G 69/183* (2013.01)
USPC ............................................. 53/267; 53/361

(58) Field of Classification Search
CPC ................................... B65B 1/00; B65G 51/00
USPC ............................ 53/471, 478, 267, 268, 361
See application file for complete search history.

(56) References Cited

U.S. PATENT DOCUMENTS

| 2,046,366 | A | * | 7/1936 | Collins ......................... 206/63.5 |
| 2,871,053 | A | * | 1/1959 | Richter ......................... 294/189 |
| 3,302,803 | A | * | 2/1967 | Mooney ......................... 414/564 |
| 4,217,156 | A | * | 8/1980 | Slungaard et al. .............. 156/69 |
| 4,470,585 | A | | 9/1984 | Bavelloni |
| 4,669,915 | A | * | 6/1987 | Shatto, Jr. ...................... 405/191 |
| 5,022,511 | A | * | 6/1991 | Gorrieri et al. ............. 198/460.1 |
| 5,323,589 | A | * | 6/1994 | Linner ............................. 53/432 |
| 5,351,864 | A | * | 10/1994 | Semenenko et al. .......... 222/504 |
| 5,423,716 | A | | 6/1995 | Strasbaugh |
| 5,427,363 | A | * | 6/1995 | Rink et al. ....................... 269/21 |

(Continued)

FOREIGN PATENT DOCUMENTS

| DE | 4038858 A1 | 6/1992 |
| DE | 10138558 A1 | 4/2003 |

(Continued)

OTHER PUBLICATIONS

European Search Report; Dec. 5, 2011; 2 pages.

*Primary Examiner* — Stephen F Gerrity
*Assistant Examiner* — Eyamindae Jallow
(74) *Attorney, Agent, or Firm* — Howard & Howard Attorneys PLLC

(57) ABSTRACT

The invention relates to apparatus 1 for releasably securing the lid 2 of a receptacle 3 for removal or replacement of the lid, the apparatus 1 comprising means 6 defining first and second vacuum chambers 5,7, the second vacuum chamber 7 being adapted to contact and secure a lid 2 when a pressure drop occurs in said second chamber 7, the arrangement being such that creating of a vacuum in the first chamber 5 acts on the defining means 6 to create a pressure drop in the second chamber 7 without fluid flow between the chambers, the pressure drop being sufficient to secure the lid 2 for removal of the lid from the receptacle.

12 Claims, 3 Drawing Sheets

(56) References Cited

U.S. PATENT DOCUMENTS

| | | | | |
|---|---|---|---|---|
| 5,473,860 A | * | 12/1995 | Linner | 53/432 |
| 5,553,612 A | | 9/1996 | Lundback | |
| 5,732,699 A | | 3/1998 | Lundback | |
| 5,732,700 A | | 3/1998 | Lundback | |
| 5,775,544 A | * | 7/1998 | Semenenko | 222/181.1 |
| 5,842,985 A | | 12/1998 | Lundback | |
| 6,305,443 B1 | * | 10/2001 | Semenenko | 141/346 |
| 6,418,701 B1 | * | 7/2002 | Navarro | 53/415 |
| 6,595,735 B1 | | 7/2003 | Lee | |
| 6,658,824 B2 | | 12/2003 | Nussbaumer et al. | |
| 6,685,060 B1 | * | 2/2004 | Lee | 222/148 |
| 6,789,780 B2 | * | 9/2004 | Pieri | 251/175 |
| 7,086,675 B2 | * | 8/2006 | Jacobs | 294/2 |
| 7,237,311 B2 | * | 7/2007 | Piepereit | 29/450 |
| 7,830,389 B2 | | 11/2010 | Maass et al. | |
| 7,887,018 B2 | | 2/2011 | Carnevali | |
| 7,997,554 B2 | | 8/2011 | Carnevali | |
| 2002/0162300 A1 | | 11/2002 | Nussbaumer et al. | |
| 2004/0222224 A1 | * | 11/2004 | Plester | 220/203.17 |
| 2005/0172580 A1 | * | 8/2005 | Krulitsch | 53/471 |
| 2009/0242719 A1 | | 10/2009 | Carnevali | |
| 2009/0242721 A1 | | 10/2009 | Carnevali | |

FOREIGN PATENT DOCUMENTS

| | | |
|---|---|---|
| EP | 0547861 A1 | 6/1993 |
| EP | 1000889 A1 | 5/2000 |
| EP | 1145999 A1 | 10/2001 |
| JP | 08112794 A | 5/2008 |
| JP | 2010155331 A | 7/2010 |
| WO | WO0153176 A1 | 7/2001 |

* cited by examiner

MATERIAL HANDLING APPARATUS

CROSS-REFERENCE TO RELATED APPLICATION

This patent application claims priority to Great Britain Patent Application Ser. No. GB 1015590.1 filed Sep. 17, 2010, entitled: "MATERIAL HANDLING APPARATUS".

FIELD OF INVENTION

This invention relates to material handling apparatus, and in particular, to material handling apparatus including a device for automated removal and replacement of a lid of a container.

BACKGROUND OF THE INVENTION

Systems for the automated and contained filling of powders into IBCs (intermediate bulk containers) including "thro lid filling systems" and "split butterfly valve systems" have been in use for some years, particularly in the pharmaceutical industry where maintaining product purity and protecting operators against active and/or toxic powders are two major requirements. Such systems include devices for the automated removal and refitting of the container lid inside the powder process itself. These devices are often very sensitive and their reliability is to some extent dependant on regular system cleaning and maintenance. They are also extremely complex and expensive. However, there is increasing demand for automated lid removal systems in other industries e.g. food manufacturing, to increase productivity, reduce labour costs and to meet increasing hygiene standards. In these applications with increased frequency of use and reduced frequency of cleaning the existing methods of lid removal suffer from a number of limitations which render them unfeasible.

One existing method used for automated lid removal includes use of a vacuum cup. The cup makes contact with the top surface of the lid and vacuum is generated in order to retain the lid against the filing system valve during powder transfer. This method is used in the Matcon™ Containment Transfer System. Characteristics include:

The generated vacuum directly retains the lid in position, i.e. a "live vacuum".
If surfaces are allowed to accumulate dust, the level of vacuum force can reduce.
Dust can also be drawn into the vacuum line causing blockage and further reduction of vacuum force.
The System is dependent on the vacuum level being sufficient to carry the weight of the lid, therefore it is not inherently fail-safe, i.e. if the vacuum should completely fail the lid is dropped.
After completion of material transfer, the lid is refitted to the container inlet by simple release of vacuum and is lowered to the correct position by gravity alone.
A more positive lid replacement can be achieved by introducing positive pressure in the vacuum line but this risks emitting a cloud of dust to the working environment and in a failure mode, could over pressurise the process equipment.

Other methods of lid retention include various forms of mechanical locking devices. Mechanical grabbing devices include sliding lock pins or bayonet devices, engaging into holes or grooves in the lid, and are effective lid retainers, but in simplest form they lack the positive up-force needed to fully seal the lid to the fill valve. They also suffer from dust ingress into the various holes and crevices, leading to cross contamination of powders being handled, plus cleaning difficulty, functionality and corrosion problems.

It is an object of the invention to seek to mitigate problems such as these.

SUMMARY OF THE INVENTION

According to the invention there is provided apparatus for releasably securing the lid of a receptacle for removal or replacement of the lid, the apparatus comprising means defining first and second vacuum chambers, the second vacuum chamber being adapted to contact and secure a lid when a pressure drop occurs in said second chamber, the arrangement being such that creation of a vacuum in the first chamber acts on the defining means to create a pressure drop in the second chamber without fluid flow between the chambers, the pressure drop being sufficient to secure the lid for removal of the lid from the receptacle. Thus the invention provides apparatus that can be used to secure the lid of a conatiner for removal or replacement thereof using vacuum that does not subject the lid or the immediate environment to the force of the vacuum.

In a preferred embodiment, the defining means comprises a flexible member, such as a diaphragm. The flexible member may comprise a wall separating interior volumes of the first and second chambers, and will preferably comprise comprise an elatomeric material.

The apparatus may include seal means to assist in sealing between the second chamber and the lid.

In one embodiment of the invention the defining means be a part of a vertically displaceable obturating device in a flow path to control flow of flowable particulate material under gravity, including means to move the secured lid and an obturating device together to allow flow of material into the container. This provides an integrated system and can also provide for positive lid replacement without emitting dust clouds into the working environment. Such a system can conveniently include an obturating device in the form of a vertically displaceable conical valve.

As an alternative the obturating device may be a cone valve of an automated container washing system, or a docking station.

According to a second aspect of the invention there is provided a method of removing and replacing a lid of a container, comprising the use of apparatus as described hereinabove.

BRIEF DESCRIPTION OF DRAWINGS

The invention will further be described by way of example and with reference to the following Figures, in which.

DETAILED DESCRIPTION

Figure 1:
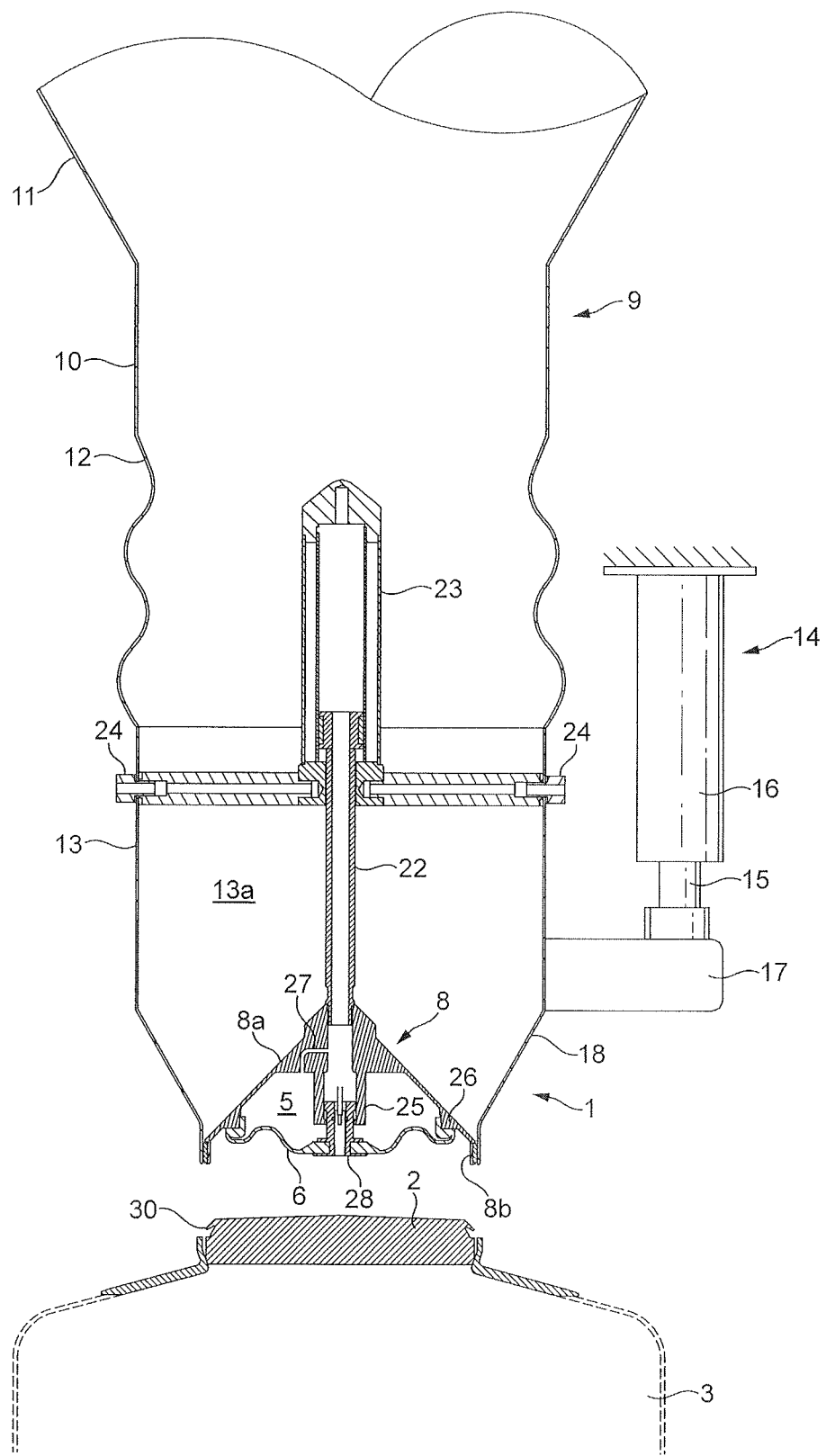
FIG. 1 is a schematic cut-away side view of part of apparatus according to the invention.

Referring to the drawings, there is illustrated apparatus 1 for releasably securing the lid 2 of a receptacle 3 for removal or replacement of the lid, the apparatus 1 comprising means 6 defining first and second vacuum chambers 5,7, the second vacuum chamber 7 being adapted to contact and secure a lid 2 when a pressure drop occurs in said second chamber 7, the arrangement being such that creation of a vacuum in the first chamber 5 acts on the defining means 6 to create a pressure drop in the second chamber 7 without fluid flow between the chambers, the pressure drop being sufficient to secure the lid 2 for removal of the lid from the receptacle.

In this example, the apparatus 1 is incorporated into or put another way, forms a part of an obturating device 8 of a delivery system 9 for delivering a flowable product by gravity flow to receptacle 3.

Referring to FIG. 1, system 9 includes an upper cylindrical guide chute 10 that is attached at its upper, as viewed end to a wider hopper section 11. The system 9 can form part of a material storage device such as a silo, or alternatively can be part of a material transfer system as illustrated, for use in transferring flowable particulate materials between containers.

Cylindrical guide chute 10 has attached at its lower, as viewed, edge a flexible conduit 12, the method of attachment being such as to prevent egress of material at the join. The conduit 12 is in turn attached in a similar fashion at its lower, as viewed, edge to a lower cylindrical guide chute 13 so as to provide a continuous flow path 13a for flowable material, the length of which can be varied by moving the lower cylindrical guide chute 13 up or down relative to the upper cylindrical guide chute 10, the movement being accommodated by the flexible conduit 12. Movement of the lower cylindrical guide chute is accomplished in this embodiment by use of main lift/lower actuator 14.

Main lift/lower actuator 14 comprises a piston 15 and cylinder 16, piston 15 being attached at its distal end relative to the cylinder to the lower cylindrical guide chute 13 by a rigid attachment bar 17. The cylinder 16 is attached to a fixed substrate relative to the apparatus 1.

Figure 2C:
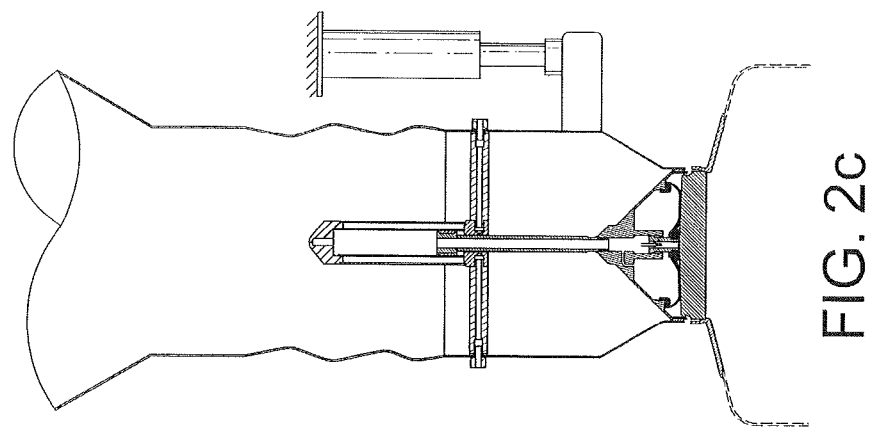
FIGS. 2a to 2e are schematic cut-away side views of apparatus according to the invention, showing a sequence of operation.
Figure 2B:
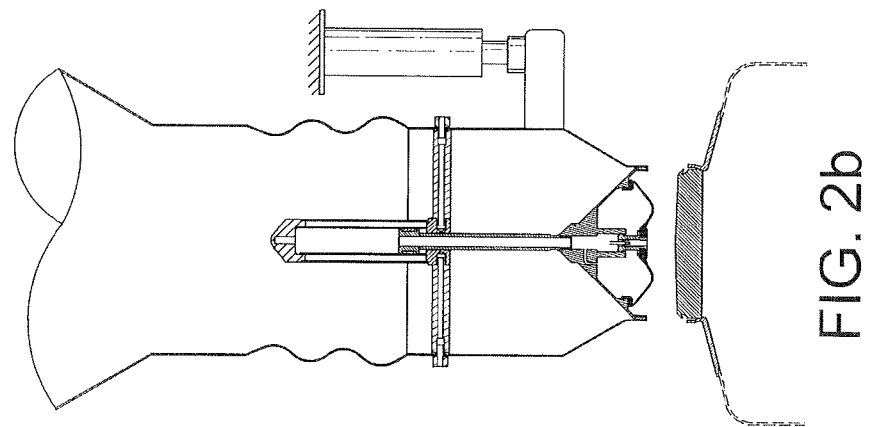
Figure 2A:
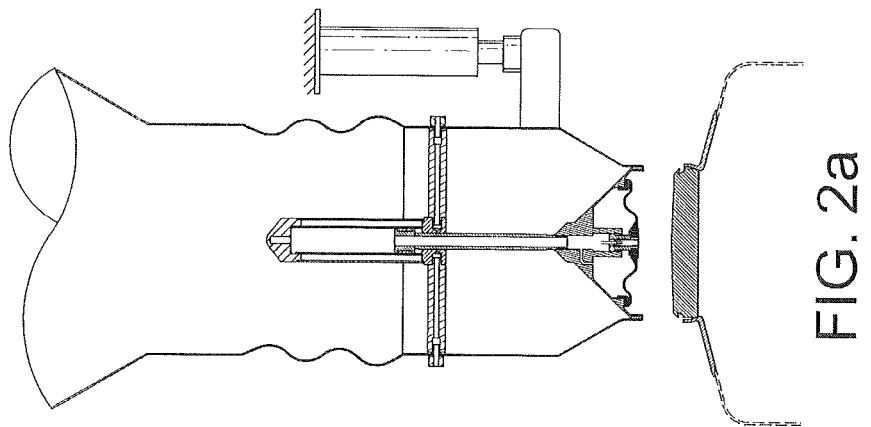
Figure 2E:
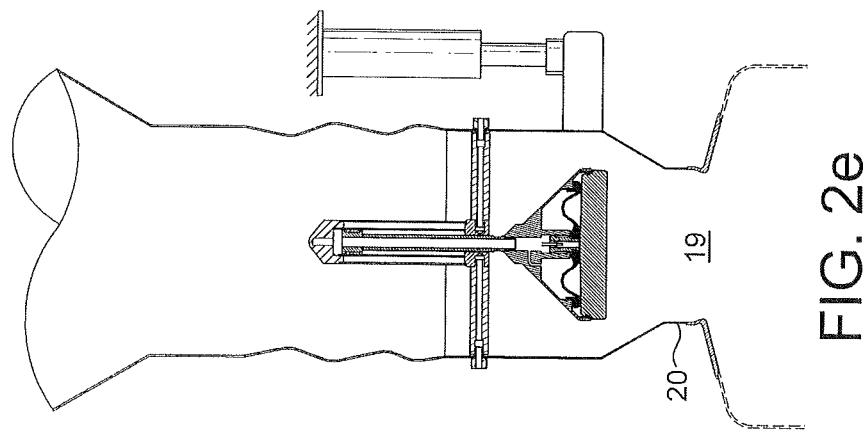

Lower cylindrical guide chute 13 includes a lower as viewed, frustoconical section 18 which terminates at its lower end in outlet 19 (FIG. 2e). Outlet 19 includes a cylindrical lip 20. Outlet 19 is obturated by obturating device 8, which in this embodiment is a cone valve of generally known type. The cone valve 8 includes a conical valve body 8a which is attached at its apex to piston 22 which in turn is received for sliding movement into cylinder 23. Cylinder 23 is suspended centrally within the flow path 13a by arms 24. At its lower, as viewed, edge the conical body 8a has a depending cylindrical skirt 8b, dimensioned to fit closely within the circumference of cylindrical lip 20. Cylindrical skirt 8b can be formed from a resilient material thus providing a seal. As is well known in the art, the cone valve 8 can be raised, as viewed, into the lower guide chute 13 to open outlet 19 for product flow under gravity.

As mentioned, the apparatus 1 is incorporated into or put another way, forms a part of an obturating device 8 of a delivery system 9 for delivering a flowable product by gravity flow to receptacle 3. More specifically, the conical body 8a of the cone valve here provides at least partially the means by which the first vacuum chamber 5 is defined. In this case the first vacuum chamber 5 is defined by the conical body 8a and defining means 6, which here is takes the form of a flexible diaphragm. Referring to FIG. 1 flexible diaphragm 6 consists of a circular elastomeric membrane with preferably a preformed curved shape such that in situ, it presents outwardly a convex surface. It can be formed from any suitable flexible, preferably resilient material such as a rubber or synthetic rubber material and is designed to provide significant operating deflection, from substantially convex in profile, to substantially concave. It is attached to the cone valve body 8a inside the cone around its inner circumference, above the depending cylindrical skirt 8b, the method of attachment being such as to be air tight, but preferably also releasable to allow for maintenance and replacement. In the present example the cone valve is provided with a circumferential seat 26 formed from a resilient material, the seat including, a groove into which a circumferential bead of the membrane can be removably inserted. It is preferred that the flexible diaphragm 6 is supported at its centre in order to give added strength to the arrangement. In this embodiment, support is provided by means of a centrally depending cylindrical formation 25 of the cone valve body 8a. In addition to providing support to the flexible diaphragm 6, the centrally depending cylindrical formation 25 also provides a convenient structure in which an air inflation/suction conduit 27 that accesses the first vacuum chamber can be formed, the piston 22 and arms 24 providing a convenient path for the conduit to extend to the exterior of the apparatus 1, and in this case, the system. It can also provide a mounting for a sensor 28 which extends through an essentially airtight via in the diaphragm to sense when a container lid is in proximity.

As illustrated in FIGS. 2a to 2d, the flexible diaphragm 6 further defines, in combination—with the lid 2 to be secured, a second vacuum chamber 7. In this embodiment it is also the case that the cone valve body 8a and the depending cylindrical skirt also partially define the second chamber 7.

Although it is not essential, the lid 2 of the container 3 can also be made to further enhance the benefits provided by the invention. In particular, the lid 2 can be provided with a soft external lip seal 30, which seals vacuum tight against the inside cylindrical surface of the cone valve body 8a. Alternatively, or in addition a similar circumferential seal can be provided on the inside cylindrical surface of the cone valve body.

Figure 2D:
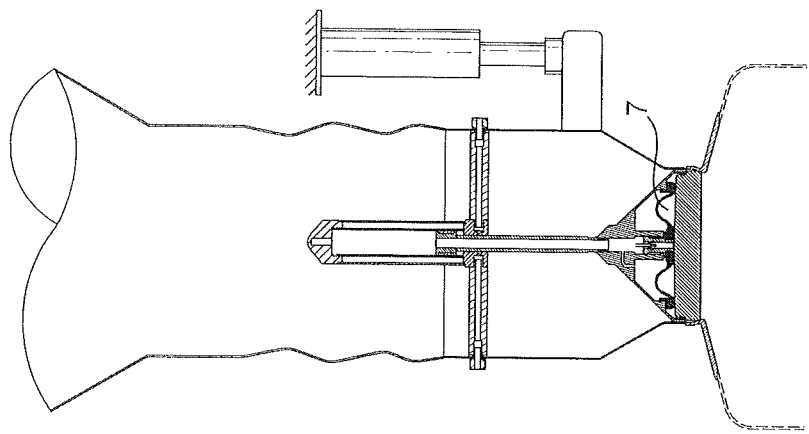

The method of operation of the apparatus 1 is illustrated in FIGS. 2a to 2e. Thus in use the apparatus 1 functions to provide a means to releasably securing lid 2 to the valve 8 to facilitate automated lid removal. FIG. 2a shows the apparatus 1 in position above a container 3 that is required to be filled. The cone valve 8 is preventing product (not shown) from flowing out of the outlet 19. In FIG. 2b the diaphragm 6 is inflated to its convex profile by blowing air in through 27, to help expel air from the second vacuum chamber before the valve 8 seals against the lid 2, thereby maximising subsequent vacuum force. In FIG. 2c, the main lift/lower actuator 14 operates to lower the lower chute 13, the movement being accommodated by the flexible conduit 12. Down force created by the main lift/lower actuator 14 forces a complete engagement of the lid 2 into the valve body 8a, overcoming the soft external lip seal. As shown in FIG. 2d a vacuum is then drawn behind the diaphragm 6 which deflects the diaphragm upwards to a concave profile, and creates "trapped vacuum" between itself and the lid 2 in the second vacuum chamber 7 formed thereby, holding the lid firmly against the valve. The magnitude of the trapped vacuum is limited either by the magnitude of the live vacuum or the available stroke of the diaphragm 6, whichever is the lower. Once the lid 2 has been secured, the cone valve 8 can be raised to initiate product flow, and the action of raising the cone valve also removes the lid 2.

During subsequent undocking, the lid 2 is placed firmly onto its correct position by inflation of the diaphragm, and is held in this position while the filling system and container 3 are separated. In this condition the diaphragm provides a barrier to the positive pressure and thereby eliminates the risk of dust cloud or over-pressurisation.

Thus, it will be appreciated that apparatus according to the invention uses vacuum to retain the lid, but includes features to overcome limitations of existing vacuum operated devices. Thus, the diaphragm 6 firstly, provides a barrier to the positive pressure and thereby eliminates the risk of dust cloud or over-pressurisation, and secondly prevents dust entering the vacuum line. The wiping action of the lip seal against the inner surface of the cone valve body 8*a* is self cleaning and thereby minimises loss of vacuum if dust is present. Furthermore the lip seal 2 provides for an interference tit with the valve 8 which retains the lid in place even if vacuum is lost, i.e. lid retention is not dependant on vacuum alone.

It is anticipated that apparatus according to the invention will also be applicable to automated container washing systems, and the principle can also be adapted to securely lock a container outlet lid (e.g. cone valve) onto a docking station e.g. for discharging or blending.

The invention claimed is:

1. Apparatus for releasably securing the lid of a receptacle for removal or replacement of the lid, the apparatus comprising:
    a first chamber defined by an upper member and a flexible lower member, a means for fluid flow into and from the first chamber whereby the first chamber may be pressurised or evacuated causing the flexible member to flex outwardly from or inwardly towards the upper member, respectively;
    a second chamber defined by the lid, a cylindrical member and the flexible member when the cylindrical member contacts the lid;
    whereby evacuation of the first chamber results in a pressure drop in the second chamber without fluid flow from the first chamber to the second chamber, or from the second chamber to the first chamber, the pressure drop being sufficient to secure the lid to the flexible member for removal of the lid from the receptacle.

2. Apparatus according to claim 1, wherein the flexible member comprises a wall separating interior volumes of the first and second chambers.

3. Apparatus according to claim 1, the flexible member comprising a diaphragm.

4. Apparatus according to claim 1, wherein the flexible member comprises an elastomeric material.

5. Apparatus according to claim 1, including seal means to assist in sealing the cylindrical body to the lid.

6. Apparatus according to clam 1, further including means to move the apparatus once the lid has been secured, for removal and replacement of the lid.

7. Apparatus according to claim 1, wherein the cylindrical body comprises a part of an obturating device of a container.

8. Apparatus according to claim 7, wherein the obturating device comprises a vertically displaceable conical valve.

9. Apparatus according to claim 8, wherein the conical valve is disposed to obturate a flow path for flowable material under gravity, the valve being raisable to initiate flow.

10. Apparatus according to claim 1, wherein the apparatus is adapted for transfer of flowable material.

11. Apparatus according to claim 1, wherein the apparatus is adapted for transfer of flowable material under gravity.

12. Apparatus according to claim 1, wherein the apparatus is adapted for transfer of flowable particulate material.

* * * * *